United States Patent [19]
Hatton

[11] Patent Number: 6,086,795
[45] Date of Patent: Jul. 11, 2000

[54] ADHESIVE COMPOSITIONS

[75] Inventor: Kevin Brian Hatton, Bishop's Stortford, United Kingdom

[73] Assignee: Ciba Specialty Chemicals Corp., Tarrytown, N.Y.

[21] Appl. No.: 09/181,163

[22] Filed: Oct. 28, 1998

[30] Foreign Application Priority Data

Oct. 29, 1997 [GB] United Kingdom ................ 9722736.7

[51] Int. Cl.⁷ .............................. F21V 9/00; C09K 11/06; B32B 27/00; B32B 27/06
[52] U.S. Cl. .......................... 252/582; 252/582; 252/587; 252/589; 252/301.21; 252/301.33; 252/301.34; 252/301.35; 428/412; 428/414; 428/423.1; 428/426; 428/473.5; 428/480
[58] Field of Search ...................... 252/582, 587, 252/589, 301.21, 301.33, 301.34, 301.35; 428/412, 414, 423.1, 426, 473.5, 480

[56] References Cited

U.S. PATENT DOCUMENTS

| | | | |
|---|---|---|---|
| 3,635,832 | 1/1972 | Toney | 252/301.21 |
| 4,239,261 | 12/1980 | Richardson | 283/21 |
| 4,405,750 | 9/1983 | Nakata | 252/301.35 |
| 4,751,020 | 6/1988 | Marten et al. | 252/301.21 |
| 5,242,725 | 9/1993 | Weissmann et al. | 428/40 |
| 5,391,414 | 2/1995 | Doering et al. | 428/64 |

FOREIGN PATENT DOCUMENTS

| | | |
|---|---|---|
| 0105062 | 4/1984 | European Pat. Off. . |
| 0768353 | 4/1997 | European Pat. Off. . |
| 4112649 | 10/1992 | Germany . |
| 1588388 | 4/1981 | United Kingdom . |
| 2123012 | 1/1984 | United Kingdom . |
| 97/36738 | 10/1997 | WIPO . |

*Primary Examiner*—Philip Tucker
*Attorney, Agent, or Firm*—Michele A. Kovaleski

[57] ABSTRACT

The present invention relates to adhesive compositions comprising at least one light emitting material and which are suitable for bonding substrates together and may be detected and measured via non-invasive techniques.

22 Claims, No Drawings

ADHESIVE COMPOSITIONS

FIELD OF THE INVENTION

The present invention relates to adhesive compositions suitable for bonding substrates together and especially where at least one of the substrates is optically clear. In particular the present invention provides an adhesive composition which contains at least one light emitting material.

BACKGROUND

In many applications it is important that the bondline thickness of the adhesive between substrates is of a known uniform thickness. However, measuring the bondline thickness after the adhesive has cured is very difficult without destroying the adhesive bond.

In certain applications it is essential that not only should the thickness of the adhesive bond be measurable, but also that the degree of adhesive cover between the substrates be assessed. These factors are of critical importance in applications where the adhesive forms the bondline between a data carrying layer, such as a polycarbonate coated with a metallised reflective layer, and say an optically clear protective layer. Failure of the adhesive to spread over, at least, the data carrying portion of the substrate surface and/or an uneven thickness of adhesive to bond between the substrates can have detrimental effects to the retrieval of data from the chosen substrate.

It has now been found that the adhesive compositions according to the present invention, which comprise at least one light emitting material, can be used to produce a bondline which can be analysed for thickness and/or surface coverage via non-invasive methods.

Thus according to a further embodiment of the present invention there is provided a non-invasive method for the measurement of the adhesive bondline thickness between substrates, at least one of which is optically clear.

DETAILED DESCRIPTION OF THE INVENTION

Adhesive Compositions

An adhesive composition as defined herein, means, a composition comprising one or more adhesive components in combination with at least one light emitting material. In addition the adhesive compositions according to the present invention may include any number of additive materials including, but not limited to, reactive diluents, toughening agents, polymerisation inhibitors, adhesion promoters and mixtures thereof. A two component adhesive system, as defined herein, means a composition comprising at least one adhesive material and at least one hardener material, wherein the adhesive and the hardener are packaged separately. Hardener, as defined herein, means, a chemical agent which, on combination with an adhesive material, and, optionally, in the presence of a suitable catalyst, is capable of reaction with the adhesive to form a bonding material. A one component adhesive system, as defined herein, means, an adhesive composition comprising at least one adhesive material which may be present in combination with a hardener material. In some one component adhesive compositions the adhesive may be cured, to form a bonding material, by the action of temperature, light, water, or a free radical reaction. In such systems it may not be necessary to include a chemical hardening agent.

Adhesives materials suitable for use in the compositions according to the present invention include: acrylic adhesives; cyanoacrylic adhesives, epoxy adhesives, polyeurethane adhesives, silicone adhesives, cationic adhesives, hot melt adhesives, anerobic adhesives and mixtures thereof. Suitable adhesive materials are described in detail at the section titled "Adhesive Materials" herein.

Light Emitting Material

The adhesive compositions according to the present invention include, as an essential feature, at least one light emitting material. Light emitting material, as defined herein, means, in general terms, a material which absorbs and re-emits light. Preferred light emitting materials for use in the compositions of the present invention re-emit light in the frequency range of from about 200 nm to about 700 nm, i.e., from UV to visible light. Light emitting materials suitable for use in the adhesive compositions herein include fluorescent, luminant and phosphorescent materials Highly preferred adhesive compositions according to the present invention include, as an essential feature, at least one fluorescent material. In general suitable fluorescent agents for use herein are colorless to weakly colored organic compounds that, in solution, or, when applied to a substrate, absorb ultraviolet light, UV-light, (such as from daylight at @ 300–430 nm) and re-emit most if the absorbed energy as blue fluorescent light between @ 400 and 500 nm.

The amount of visible light generated by the fluorescence of any of the adhesive compositions herein is dependent upon a number of variables either singly or in combination, such as, concentration of the fluorescent agent in the adhesive, the intensity of the UV source used in detection, the thickness of the adhesive layer, the particular substrate used, and the like. For example, in thin films, having a thickness in the region of from 0 to about 100 $\mu$m, the amount of visible light which may be emitted from an adhesive herein, is generally understood to be linear with respect to the adhesive thickness. However, as the adhesive film thickness increases, then, the relationship between the amount of visible light generated and the absolute film thickness is understood to become non-linear.

Fluorescent agent suitable for use herein include those standard in the art, including those as detailed in Ullman's Encyclopedia of Industrial Chemistry Vol. A18 (5th Edition) pp. 153–167, such as, distyryl benzenes, distyryl biphenyls and divinyl stilbenes, triazinyl amino stilbenes, stiylbenzyl-2H-triaoles such as, stilbenyl-2H-naphtho [1,2-d] triazols and bis (1,2,3-triazol-2-yl) stilbenes, benzoxazoles such as, stilbenylbenzoxazoles and bis (benzoxazoles), furans ans benzo [b] furans, such as bis (benzo [b] furan-2-yl) biphenyls and benzimnidazoles such as cationic benzimidazsoles, 1,3-diphenyl-2-pyrazolines, coumarins, naphthalimides and 1,3,5-triazin-2-yl derivatives and mixtures thereof. Further suitable fluorescent materials suitable for use in the compositions herein are detailed in European Patent application no. EP-A-0, 682, 145 in the name of Ciba Specialty Chemicals Holding Inc., the contents of which are included herein by reference.

The light emitting agent, or mixture thereof is typically present at levels of from about 0.001% to about 1%, preferably from about 0.01% to about 0.8%, more preferably from about 0.05% to about 0.5% and especially from about 0.08% to about 0.2% by weight of the light emitting adhesive composition.

Adhesive Materials (1)(i) Acrylic Adhesives

Acrylic adhesives may be cured by the action of heat and/or light. As such, acrylic adhesives are generally formulated as one component systems. Examples of acrylic adhesives suitable for use herein include those standard in the art.

Suitable acrylic resins for use in the compositions according to the present invention include compounds containing at least two groups of formula:

$$CH_2=CR^3-COO- \qquad (I)$$

where
$R^3$ represents a hydrogen or chlorine atom, or a methyl or ethyl group.

Suitable esters having at least two groups of formula (I) include esters, especially acrylates and methacrylates, of aliphatic, cycloaliphatic, alicyclyaliphatic, araliphatic or heterocyclylaliphatic polyhydric alcohols, especially diols and triols; polyhydroxy-, particularly dihydroxy-, carboxylic acid; polyhydroxy-, particularly dihydroxy-, alkylamines; and polyhydroxy-, particularly dihydroxy-, alkylnitriles. Acrylic ester-urethanes and -ureides may also be used. Such esters are, in general, commercially available, and any that are not may be prepared by known methods.

Suitable acrylic esters include those of formula:

$$CH_2=\underset{R^3}{C}-\underset{\underset{O}{\parallel}}{C}-O-[(CH_2)_{\overline{x}}-(CHR^4)_cCHO\overline{]_b}-\underset{\underset{O}{\parallel}}{C}-\underset{R^3}{C}=CH_2 \qquad (II)$$

where
$R^3$ is as hereinbefore defined,
$R^5$ denotes H, $CH_3$, $-C_2H_5$, $-CH_2OH$, or $$-CH_2O-\underset{\underset{O}{\parallel}}{C}-\underset{R^3}{C}=CH_2,$$

$R^4$ denotes H, OH, or $$-O\underset{\underset{O}{\parallel}}{C}C=CH_2$$
$\phantom{-OCC=}\,R^3$ x is an integer of from 1 to 8,
b is an integer of from 1 to 20, and
c is zero or 1.

Among compounds of formula (II), those where x is from 1 to 4, b is from 1 to 5 and $R^3$ denotes a hydrogen atom or a methyl group are preferred. Specific examples of such compounds are the diacrylates and dimethacrylates of ethylene glycol, propylene glycol, butane-1,4-diol, diethylene glycol, dipropylene glycol, triethylene glycol, tripropylene glycol, tetraethylene glycol and tetrapropylene glycol.

Other suitable acrylic esters are of formula:

$$\left[CH_2=C-\underset{\underset{O}{\parallel}}{C}-O-[(CH_2)_d\underset{\underset{R^4}{|}}{\overset{\overset{R^3}{|}}{C}}O\overline{]_b}\right]_e-R^6 \qquad (III)$$

where
b, c, $R^3$ and $R^4$ have the meanings assigned above, d is zero or a positive integer, provided that c and d are not both zero, e is 2, 3, or 4, and
$R^6$ denotes an organic radical of valency e linked through a carbon atoms or carbon atoms thereof to the indicated b oxygen atoms.

Preferred among compounds of formula (III) are those where b, c and d are each 1, $R^3$ is a hydrogen atom or methyl group and $R^6$ is a hydrocarbon residue of an aliphatic polyhydric alcohol having from 2 to 6 carbon atoms, such as a pentaerythrityl group. A specific example of such compounds is pentaerythrityl tetrakis (dimethylene glycol acrylate).

Yet other suitable esters are those of formula $$\left[CH_2=\underset{R^7}{C}-\underset{\underset{O}{\parallel}}{C}-O-CH_2-\underset{\underset{OH}{|}}{CH}-CH_2-O-(CO)_{\overline{c}}\right]_e-R^8 \qquad (IV)$$

wherein
c and e have the meanings previously assigned,
$R^7$ denotes —H or —$CH_3$, and $R^8$ denotes an organic radical or valency e, linked through a carbon atom thereof other than the carbon atom of a carbonyl group.

More particularly, when c is zero, $R^8$ may denote the residue, containing from 1 to 60 carbon atoms, of an alcohol or phenol having e hydroxyl groups.

$R^8$ may thus represent an aromatic, araliphatic, alkaromatic, cycloaliphatic, heterocyclic, or heterocycloaliphatic group, such as an aromatic group containing only one benzene ring, optionally substituted by chlorine, bromine or an alkyl group of from 1 to 9 carbon atoms, or an aromatic group comprising a chain of two to four benzene rings, optionally interrupted by ether oxygen atoms, aliphatic hydrocarbon groups of 1 to 4 carbon atoms, or sulphone groups, each benzene ring being optionally substituted by chloride, bromine or an alkyl group of from 1 to 9 carbon atoms, or a saturated or unsaturated, straight or branched-chain aliphatic group, which may contain ether oxygen linkages and which may be substituted by hydroxyl groups, especially a saturated or monoethylenically unsaturated straight chain aliphatic hydrocarbon group of from 1 to 8 carbon atoms.

Specific examples of such groups are the aromatic groups of the formulae —$C_6H_4C(CH_3)_2C_6H_4$—, in which case e is 2, and —$C_6H_4(CH_2C_6H_3-)_f-CH_2C_6H_4$— where f is 1 or 2, in which case e is 3 or 4, and the aliphatic groups of formula —$CH_2CHCH_2$— or —$CH_2CH(CH_2)_3CH_2$—, in which case e is 3, or of formula —$(CH_2)_4$—, —$CH_2CH=CHCH_2$—, $CH_2CH_2OCH_2CH_2$—, or —$(CH_2CH_2O)_2CH_2CH_2$—, in which case e is 2. When c is 1, $R^8$ may represent the residue, containing from 1 to 60 carbon atoms, of an acid having e carboxyl groups, preferably a saturated or ethylenically unsaturated, straight chain or branched aliphatic hydrocarbon group of from 1 to 20 carbon atoms, which may be substituted by chlorine atoms and which may be interrupted by ether oxygen atoms and/or by carbonyloxy (—COO—) groups, or a saturated or ethylenically unsaturated cycloaliphatic or aliphatic-cycloaliphatic hydrocarbon group of at least 4 carbon atoms, which may be substituted by chlorine atoms, or an aromatic hydrocarbon group of from 6 to 12 carbon atoms which may be substituted by chlorine or bromine atoms.

Further preferred compounds where c is 1 are those in which $R^8$ represents a saturated or etehylenically unsaturated straight chain or branched aliphatic hydrocarbon group of from 1 to 8 carbon atoms, optionally substituted by a hydroxyl group, or a saturated or ethylenically unsaturated straight chain or branched aliphatic hydrocarbon group of from 4 to 50 carbon atoms and interrupted in the chain by carbonyloxy groups, or a saturated or ethylenically unsaturated monocyclic or bicyclic cycloaliphatic hydrocarbon group of 6 to 8 carbon atoms, or an ethylenically unsaturated cycloaliphatic-aliphatic hydrocarbon group of from 10 to 51 carbon atoms, or a mononuclear aromatic hydrocarbon group of from 6 to 8 carbon atoms. Specific examples of these residues of carboxylic acid are those of formula —$CH_2CH_2$—, $CH=CH$—, and —$C_6H_4$— where e is 2.

Specific examples of suitable compounds of formula (IV) are epoxy acrylates such as 1,4-bis(2-hydroxy-3-(acryloyloxy)propoxy)butane, poly(2-hydroxy-3-(acryloyloxy)propyl)ethers of bis(4-hydroxyphenyl)methane (bisphenol F), 2,2-bis(4-hydroxyphenyl)propane (bisphenol A) and phenol-formaldehyde novolaks, bis(2-hydroxy-3-acryloyloxypropyl) adipate and the methacryloyloxy analogues of these compounds.

(ii) Urethanes

Still other suitable esters are urethane acrylates and ureide acrylates of formula $$\left[ CH_2=C(R^3)-\overset{O}{\overset{\|}{C}}-O-R^9-X-\overset{O}{\overset{\|}{C}}-NH- \right]_g R^{10} \quad (V)$$

wherein, $R^3$ has the meaning assigned above, $R^9$ denotes a divalent aliphatic, cycloaliphatic, aromatic, or araliphatic group, bound through a carbon atom or carbon atoms thereof of the indicate —O— atom and —X— atom or group, X denotes —O—, —NH—, or —N(alkyl)—, in which the alkyl radical has from 1 to 8 carbon atoms, g is an integer of at least 2 and at most 6, and $R^{10}$ denotes a g-valent cycloaliphatic, aromatic, or araliphatic group bound through a carbon atoms or carbon atoms thereof to the indicate NH groups.

Preferably $R^9$ denotes a divalent aliphatic group of 2 to 6 carbon atoms and $R^{10}$ denotes one of the following:

a divalent aliphatic group of 2 to 10 carbon atoms, such as a group of formula:

—$(CH_2)_6$—, $CH_2C(CH_3)_2CH_2CH(CH_3)(CH_2)$—, or

—$CH_2CH(CH_3)CH_2C(CH_3)_2CH_2)_2$—; or a phenylene group, optionally substituted by a methyl group or a chlorine atom; a naphthylene group; a group of formula:

—$C_6H_4C_6H_4$—, $C_6H_4CH_2C_6H_4$—, or —$C_6H_4C(CH_3)_2C_6H_4$—;

or a mononuclear alkylcycloalkylene or alkylcycloalkylalkylene group of from 63 to 10 carbon atoms, such as a methylcyclohex-2,4-ylene, methylcyclohex-2,6-ylene, or 1,3,3-trimethylcyclohex-5-ylenemethyl group.

Specific examples of compounds of formula (V) are 2,4- and 2,6-(bis(2-acryloyloxyethoxy carbonamido) toluene and the corresponding methacryloyloxy compounds.

(iii) Peroxyacrylates

Further suitable acrylic esters are those of formula:

$$R^{11}-\overset{R^{12}}{\underset{|}{C}}-(CH_2OOC-\overset{R^3}{\underset{|}{C}}=CH_2)_2 \quad (VI)$$

wherein $R^3$ has the meaning assigned above, $R^{11}$ denotes $CH_3$—, $C_2H_5$—, —$CH_2OH$ or $CH_2=C(R^3)COOCH_2$—, and $R^{12}$ denotes —$CH_2OH$ or —$CH_2OOC$—$C(R^3)=CH_2$, especially 1,1,1-trimethylolpropane triacrylate, pentaerythritol tetra-acrylate and the corresponding methacrylates.

Still further suitable acrylic esters are those of formula:

$$\underset{HOOC}{\overset{R^3}{\underset{|}{CH_2}}=\overset{R^{13}}{\underset{|}{C}}COOH_2CHOOC}\diagdown_{R^{14}}\diagup\overset{R^{13}}{\underset{|}{COOCHCH_2OOCC}}=\overset{R^3}{\underset{|}{CH_2}} \quad (VII)$$

wherein $R^3$ has the meaning assigned above, $R^{13}$ denotes —H, —$CH_3$ or —$CH_2Cl$, and $R^{14}$ denotes a tetravalent residue, containing up to 20 carbon atoms and one or more carbocyclic rings, of a tetracarboxylic acid after removal of four carboxyl groups, each indicate pair of groups —$COOCH(R^{13})CH_2OOCC(R^3)=CH_2$ and —COOH being directly linked to adjacent carbon atoms.

Preferably, $R^3$ and $R^{13}$ are —H or —$CH_3$ and $R^{14}$ is the residue of an aromatic tetracarboxylic acid having one or two benzene rings, especially pyromellitic acid or benzophenone-3,3', 4,4'-tetracarboxylic acid.

(2) Epoxy Adhesives

Epoxy adhesives can be present in either one or two component adhesive systems. In two component systems comprising epoxy adhesive, typical hardeners include aliphatic amines, aromatic amines, anhydrides and other hardeners as are well known in the art. In one component systems comprising epoxy adhesive suitable hardeners include iodonium, sulphonium and ferroceium salts which are cured by irradiation with ultra violet light.

Examples of epoxy adhesives suitable for use in the compositions according to the present invention include: polyglycidyl esters, polyglycidyl ethers, cycloaliphatic epcxides and mixtures thereof.

Epoxides which may be employed are preferably those containing, on average, more than one group of formula:

$$-CH_2-\underset{R^1}{\overset{O}{\underset{|}{C}}}-CH_2 \quad (VIII)$$

directly attached to an atom or atoms of oxygen or nitrogen, where $R^1$ denotes a hydrogen atom or a methyl group.

As examples of such epoxides may be mentioned polyglycidyl and poly(beta-methylglycidyl) esters obtainable by reaction of a compound containing two or more carboxylic acid groups per molecule with epichlorohydrin, glycerol dichlorohydrin, or beta-methylepichlorohydrin in the presence of an alkali. Such polyglycidyl esters may be derived from aliphatic polycarboxylic acids, e.g. oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahycirophthalic acid; and from aromatic polycarboxylic acids such as phthalic acid, isophthalic acid, and terephthalic acid.

Further examples are polyglycidyl and poly(beta-methylglycidyl)ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acrylic alcohols such as ethylene glycol, diethylene glycol, and higher poly(oxyethylene) glycols, propane-1,2-diol and poly(oxypropylene)glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylol-propane, pentaerythritol, sorbitol, and polyepichlorohydrins; from cycloaliphatic alcohols such as resorcitol, quinitol, bis(4-hydroxycylohexyl)methane, 2,2-bis(4-hydroxycyclohexyl)propane, and 1-1-bis(hydroxymethyl) cyclohex-3-ene; and from alcohols having aromatic nuclei, such as 2,4-(dihydroxymethyl)benzene. They may also be made from mononuclear phenols, such as resorcinol and hydroquinone, and from polynuclear phenols, such as bis (4-hydroxyphenyl)methane, 4,4'-dihydroxydiphenyl, 1,1,2, 2-tetrakis(4-hydroxyphenyl)ethane, 2,2-bis(4-hydroxyphenyl)-propane, 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert-butylphenol.

Epoxides in which some or all of the epoxide groups are not terminal may also be employed, such as vinylcyclohexane dioxide, limonene dioxide, dicyclopentadiene dioxide, 4-oxatetracyclo $[6,2.1.0^{2,7}.0^{3,5}]$ undec-9-yl glycidyl ether, the bis(4-oxatetracyclo $[6.2.1.0^{2,7}.0^{3,5}]$ undec-9-yl ether or ethylene glycol, 3-4-epoxycylohexylmethyl 3',4'-epoxycyclohexane carboxylate and its $6,6^1$ dimethyl derivative, the bis(3,4-epoxycyclohexane-carboxylate) of ethylene glycol, 3-(3,4-epoxycyclohexyl)-8,9-epoxy-2,4-dioxaspire[5,5]undecane, and epoxidised butadienes or copolymers of butadiene with ethyleneic compounds such as styrene and vinyl acetate.

Epoxide resin having the 1,2-epoxide groups attached to different kinds of hetero atoms may be employed, e.g. the glycidyl ether-glycidyl ester of salicyclic acid. If desired, a mixture of epoxide resins may be used.

Preferred epoxides are polyglycidyl esters, polyglycidyl ethers of 2,2-bis(4-hydroxyphenyl)propane, of bis(4-hydroxyphenol)-methane or of a novolak formed from formaldehyde and phenol, or phenol substituted in the ring by one chlorine atom or by one alkyl hydrocarbon group containing from one to nine carbon atoms, and having a 1,2-epoxide content of at least 0.5 equivalent per kilogram, and 3,4-epoxycyclohexylmetlhyl 3',4'-epoxycyclohexane carboxylate.

Preferably the adhesive material, or mixture thereof, comprises at least 90%, more preferably from about 90% to about 99.999%, and especially from about 99.90% to about 99.98% of the light emitting composition of the present invention.

Photocurable Adhesive Compositions

The preferred adhesives for use in the compositions according to the present invention are photocurable adhesives. In particular, photocurable adhesives comprising a mixture of adhesive material in combination with a light emitting material as well as a photinitiator are especially preferred.

Preferred photocurable adhesive compositions suitable for use herein include adhesives comprising: (I) a photocurable material having, on average, more than one acrylic group per molecule, from at least about 20% to about 70%, preferably from about 30% to about 60%, more preferably from about 40% to about 55% and especially from about 45% to about 50% by weight of said material being a urethane acrylate, a polyester acrylate or a mixture of a urethane acrylate and a polyester acrylate, optionally (II) as sole or major sold film-forming component, a solid polyvinylacetal; (III) a photoinitiator for photopolymerisation of acrylic compounds and (IV) a light emitting material.

Preferred photocurable adhesives for use herein include aliphatic, cycloaliphatic or aromatic urethane acrylate and mixtures thereof. In general, better results are obtained with aliphatic and cycloaliphatic urethane acrylates. The urethane acrylate may be a reaction product of a polyisocyanate, i.e. a material having, on average, more than one isocyanate group per molecule, with a substance having at least one hydroxyl group and at least one polymerisable acrylic group. For example, it may be a reaction product of an aliphatic or cycloaliphatic diisocyanate and an adduct of an epoxide resin, such as 1,4-butanediol diglycidyl ether, with acrylic acid or methacrylic acid. Alternatively, the urethane acrylate may be a reaction product of a polyol, i.e. a material having, on average, more than one hydroxyl group per molecule, with a substance having at least one isocyanate group and at least one polymerisable acrylic group; for instance, it may be a reaction product of a polyoxyalkylene glycol with 2-isocyanatoethyl methacrylate.

A preferred class of photopolymerisable polyurethane is a reaction product of (A) an isocyanate-terminated polyurethane prepolymer with (B) a hydroxyl group—containing acrylic compound. Isocyanate-terminated polyurethane prepolymers are available commercially or may be obtained by well established procedures. They may be prepared, for example, by reaction of a polyol, such as a hydroxy-terminated polyether or polyester, or a polyamine, such as a polyoxyalkylene polyamine, with a stoichiometric excess of a polyisocyanate, such as an aliphatic or cycloaliphatic polyisocyanate.

A preferred isocyanate-terminated prepolymer (A) is a reaction product of a polyoxyalkylene glycol with a diisocyanate. Suitable polyoxyalkylene glycols include polyoxyethylene glycols, polyoxypropylene glycols, polyoxytetramethylene glycols, polyoxyalkylene glycols obtained by reacting diols such as 1,4-butanediol, neopentyl glycol or 1,6-hexanediol with ethylene oxide or propylene oxide, and mixtures of two or more thereof; polyoxyethylene glycols and polyoxypropylene glycols are preferred, especially those having a molecular weight of 1000 or more.

The diisocyanate reacted with the polyoxyalkylene glycol may be an aliphatic diisocyanate such as 1,2-propylene-, 1,3-propylene-,1, 2-butylene-, 1,4-butylene-, pentamethylene-, hexamethylene-, 2,4,4-trimethylhexamethylene-, 2,2,4-trimethylhexamethylene- and dodecamethylene-diisocyanates; cycloaliphatic diisocyanates such as 1,3-cyclohexylene- and 1,4-cyclohexylene-diisocyanates, methyl-2,4-cyclohexylenediisocyanate, methyl-2,6-cyclohexylenediisocyanate, 1,3-bis (isocyanatomethyl) cyclohexane, 1,4-bis(isocyanatomethyl) cyclohexane, 3-isocyanatomethyl-3,5,5-trimethylcyclohexylisocyanate (isophorone diisocyanate), and 4,4$^1$-methylenebis(cyclohexylisocyanate); and aromatic diisocyanates such as m- and p-phenylene diisocyanates, 2,4- and 2,6-tolylenediisocyanates, 1-chloro-2,4-diisocyanatobenzene, 1,4-naphthalenediisocyanate, 4,4$^1$-diphenylmethanediisocyanate and 4,4$^1$-diphenylether diisocyanate. Mixtures of two or more of the above diisocyanates can be used. Amongst these diisocyantes, diphatic and cycloaliphatic diisocyanatec are preferred, especially isophorone diisocyanate.

The hydroxyl-containing acrylic compound reacted with the isocyanate-terminated prepolymer is preferably a hydroxyalkyl acrylate or hydroxyalkyl methacrylate such as 2-hydroxyethyl acrylate, 2-hydroxypropyl acrylate, 3-hydroxypropyl acrylate, 4-hydroxybutyl acrylate and the corresponding methacrylates. Especially preferred compounds are 2-hydroxyethyl acrylate and 2-hydroxyethyl methacrylate.

Reaction of the isocyanate-terminated prepolymer with the hydroxyl-containing acrylic compound to give the photocurable urethane acrylate may be carried out using conventional procedures, for example by heating at 30–110° C. in an inert solvent in the presence of a polymerization inhibitor such as hydroquinone.

Photocurable urethane acrylates of the type described above are commercially available.

For example, they are available from UCB under the trade mark Ebecryl (FRTM) and under the designation IRR. They are also available from Ancomer under the trade mark Actocryl (RTM) and under the designation LPX, from Harcros under the trade mark Photomer (RTM) and from Craynor under the trade mark Sartomer (RTM).

The photocurable polyester acrylate used as part or all of the photocurable component (I) may be a polyester modified after formation by a reaction to introduce, on average, more than one acrylic group per molecule. For example, the polyester acrylate may be a reaction product of a hydroxyl-terminated polyester with an acrylic compound having a hydroxyl-reactive group which is a carboxyl group, a carboxylic acid halide group or an epoxide group.

Hydroxyl-terminated polyesters which may be acrylated as hereinbefore described include reaction products of dihydric alcohols with a stoichiometric deficiency of dicarboxylic acids or their anhydrides or halides. Suitable dihydric alcohols for the preparation of such polyesters include alkylene glycols such as ethylene glycol, 1,2-propylene glycol, 1,3-propylene glycol, 1,4-butanediol, neopentyl glycol, and 1,6-hexanediol; oxyalkylene glycols such as reaction products of the above mentioned alkylene glycols or dihydric phenols with ethylene oxide or propylene oxide, diethylene glycol, triethylene glycol, higher polyoxyethylene glycols, dipropylene glycol, tripropylene glycol, higher polyoxypropylene glycols and polyoxytetramethylene glycols (polytetrahydrofurans). Suitable dicarboxylic acids and anhydrides for the preparation of such polyesters include aliphatic acids and anhydrides such as succinic acid, succinic anhydride, glutaric acid, glutaric anhydride, adipic acid, pimelic acid, suberic acid, azelaic acid, sebacic acid, maleic acid, maleic anhydride and fumaric acid; cycloaliphatic acids and anhydrides such as tetrahydrophthalic acid, hexahydrophthalic acid and their anhydrides; and aromatic acids and anhydrides such as phthalic acid, phthalic anhydride, isophthalic acid and terephthalic acid.

Other hydroxyl-terminated polyesters which may be acrylated as hereinbefore described are reaction products of polyhydric alcohols or alkylene oxides with carboxyl-terminated polyesters, which carboxyl-terminated polyesters may be reaction products of dihydric alcohols such as those hereinbefore mentioned with a stoichiometric excess of dicarboxylic acids or anhydrides such as those mentioned above or reaction products ol a dicarboxylic acid or anhydride such as those mentioned above with a hydroxyl-terminatead polyester derived from a dihydric alcohol and dicarboxylic acid or anhydride as described above. Suitable polyhydric alcohols for reaction with a carboxyl-terminated polyester to give a hydroxyl-terminated polyester include the dihydric alcohols mentioned above and higher functional polyhydric alcohols such as trimethylolethane, 1,1,1-trimethylolpropane, pentaerythritol, dipentaerythritol, sorbitol and adducts of such higher functional alcohols with ethylene oxide or propylene oxide. Suitable alkylene oxides for reaction with carboxyl-terminated polyesters to give hydroxyl-terminated polyesters are ethylene oxide and propylene oxide.

The hydroxyl-reactive acrylic compound reacted with the hydroxyl-terminated polyester to form a polyester acrylate may be acrylic acid, acryloyl chloride, methacrylic acid, methacryloyl chloride, glycidyl acrylate, glycidyl methacrylate, a reaction product of 1 mole of a hydroxyalkyl acrylate or a hydroxyalkyl methacrylate with 1 mole of a dicarboxylic acid anhydride or an acid halide of such a reaction product. Preferably, the hydroxyl-reactive acrylic compound is acrylic acid, methacrylic acid, acryloyl chloride or methacryloyl chloride.

Other photopolymerisable polyester acrylates which can be used are reaction products of a carboxyl-terminated polyester with an acrylic compound having a carboxyl-reactive group which is a hydroxyl group or an epoxide group. Suitable carboxyl-terminated polyesters include those derived from a dihydric alcohol and a stoichiometric excess of a dicarboxylic acid or anhydride as hereinbefore described. Other suitable carboxyl-terminated polyesters are reaction products of hydroxyl-terminated polyesters, such as those described above, with a polycarboxylic acid or a halide or anhydride thereof, such as the dicarboxylic acids and anhydrides mentioned above and higher functional acids and anhydrides such as trimellitic acid, pyromellitic acid, benzophenone tetracarboxylic acid and their anhydrides. The carboxyl-reactive acrylic compound which is reacted with the carboxyl-terminated polyester to form a photopolymerisable polyester acrylate may be a hydroxyalkyl acrylate or a hydroxyalkyl methacrylate, such as 2-hydroxyethyl acrylate, 2-hydroxypropyl acrylate, 3-hydroxypropyl acrylate, 4-hydroxybutyl acrylate, and the corresponding methacrylates, glycidyl acrylate or glycidyl methacrylate.

Examples of suitable polyester acrylates as hereinbefore described are given in U.S. Pat. No. 4,206,025, assigned to UCB. Suitable polyester acrylates are available commercially from UCB under the trade mark Ebecryl (RTM).

The urethane acrylate and/or polyester acrylate may comprise substantially all of the photocurable material (I). Where a mixture of urethane acrylate and polyester acrylate is used, the weight ratio of urethane acrylate to polyester acrylate may be from 1:99 to 99:1. Alternatively, the photocurable material (I) may comprise a mixture of the urethane acrylate and/or the polyester acrylate with a polyacrylic ester of a monomeric polyhydric alcohol, a polyacrylic ester of a polyether polyol or a polyacrylic ester of an epoxide resin. The polyacrylic ester may comprise from 0.1 to 80%, for example 5 to 75%, 10 to 75%, 20 to 75%, 30 to 75%, 40 to 75%, 50 to 75%, or 60 to 75% by weight of the mixture.

Examples of polyacrylic esters of monomeric polyhydric alcohols are polyacrylates and polymethacrylates of glycols, including alkylene glycols such as ethylene glycol, 1,2 propylene glycol, 1,3-propylene glycol, 1,4-butanediol, neopentyl glycol and 1,6-hexanediol and oxyalkylene glycols such diethylene glycol, triethylene glycol, dipropylene glycol and tripropylene glycol; and polyacrylates and polymethacrylates of higher functional alcohols such as glycerol, 1,1,1-trimethylolpropane, pentaerythritol and adducts of these alcohols with ethylene oxide or propylene oxide. Suitable polyacrylic esters of polyether polyols include polyacrylates and polymethacrylates of polyols such as polyoxyethylene glycols, polyoxypropylene glycols and polyoxytetramethylene glycols (poly tetrahydrofurans). Examples of polyacrylic esters of epoxide resins are adducts of acrylic acid or methacrylic acid with polyglycidyl ethers of polyhydric alcohols, such as the polyhydric alcohols mentioned above, or of polyhydric phenols, usually bisphenols, such as bisphenol A, or novolac resins. Polyacrylic esters of monomeric alcohols and polyacrylic esters of epoxide resins are preferred for use with the urethane acrylate and/or polyester acrylate, especially preferred polyacrylic esters being 1,4-butanediol diacrylate and diacrylic esters of advanced, particularly bisphenol A-advanced, diglycidyl ethers of bisphenol A.

Mixtures of photopolymerisable polyurethanes and photopolymerisable polyesters as hereinbefore described may be used as the adhesive component of the light emitting compositions of the present invention.

The photocurable acrylic material (I) may comprise 100% by weight urethane acrylate, or 100% by weight polyester acrylate, or a mixture of 95 to 50%, especially 95 to 85%, by weight polyester acrylate with 5 to 50%, especially 5 to 15%, by weight urethane acrylate, or a mixture of 20 to 40%, especially 25 to 35%, by weight of urethane acrylate with 80 to 60%, especially 75 to 65%, by weight of a polyacrylic ester of a monomeric polyhydric alcohol or a mixture of 50 to 70%, especially 55 to 65%, by weight polyester acrylate with 50 to 30%, especially 45 to 35%, by weight of a polyacrylic ester of an epoxide resin.

The optional film forming component, polyacetal (II), may be, for example, a polyvinylformal, a polyvinylacetal or a polyvinylbutyral. Suitable such polymers are available commercially. Polyvinylbutyrals are preferred, especially those having a softening point of at least 150° C., e.g. in the range 150–180° C. or at least 200° C. As indicated above, the polyvinylacetal is the sole or major solid film-forming component of the film adhesive of the invention. The amount chosen for a particular adhesive is such that the adhesive is a solid, self-supporting film. As will be apparent to those skilled in the art, this amount can vary according to the nature of the photocurable acrylic material (I), the nature of any optional ancillary components of the film adhesive and their relative amounts. Optimum amounts of a polyvinylacetal (II) for a particular adhesive can readily be determined by simple experiment. In general, the polyvinylacetal may be present in amounts from 20 to 150% by weight of the photocurable acrylic material (I).

If desired, the film adhesive of the invention may also contain other solid film-forming polymers, for example olefin-vinyl ester copolymers such as ethylene-vinyl acetate copolymers, olefin-alkyl acrylate copolymers such as ethylene-ethyl acrylate copolymers, other acrylic polymers, phenoxy resins, advanced epoxide resins or (non-acrylated) polyurethanes.

Other photopolymerisable acrylic materials which may be included in the compositions of the present invention are adducts of acrylic acid or methacrylic acid with epoxide resins, which may be cycloaliphatic epoxide resins having epoxide groups attached to cycloaliphatic ring carbon atoms or, preferably, polyglycidyl ethers of polyhydric alcohols such as the alcohols hereinbefore mentioned or polyglycidyl ethers of polyhydric phenols, especially bisphenols such as bisphenol A or bisphenol F or phenolic novolak resins, and advancement products of such polyglycidyl ethers, i.e. advanced epoxide resins prepared by reacting such polyglycidyl ethers with difunctional reactants such as dihydric alcohols or dihydric pherols.

The photopolymerisable polyurethane and/or polyester (I) is generally present in an amount of from at least about 20% to about 70%, preferably from about 30% to about 60%, more preferably from about 40% to about 55% and especially from about 45% to about 50% by weight of the light emitting adhesive composition. When the liquid composition contains an acrylic monomer reactive diluent, it is generally present in an amount of from about 5% up to about 70%, preferably from about 20% to about 65%, more preferably from about 30% to about 60%, most preferably from about 50% to about 60% by weight of the light emitting composition. The photopolymerisation initiator (III) is usually present in the composition in conventional amounts, generally from about 0.01% to about 20%, preferably from about 0.1% to about 10%, more preferably from about 0.1% to about 5% and most preferably from about 1% to about 5% by weight of the total photopolymerisable acrylic component of the liquid compositions, i.e. (II) together with any other photopolymerisable acrylic material. A suitable amount of polyvinylacetal can be determined readily by simple experiment; generally it is present in an amount of 0.2 to 20%, preferably 0.5 to 10%, by weight of the adhesive composition. Similarly, the amount of any toughening agent to be included in the composition may be chosen to give a desired degree of toughness; generally the toughening agent is present in an amount of 0.2 to 20%, more usually 1 to 10%, by weight of the liquid composition.

Curing of Adhesives (I) Chemical Curing

As hereinbefore described many adhesives may be cured using a chemical curing agent. For the avoidance of doubt the terms hardener and chemical curing agent are used interchangeably herein. Chemical curing agents suitable for use in the adhesive systems of the present invention include those which are standard and well known in the art including: curing agents derived from a polyamine having from 2 to 10 amino groups, preferably from 3 to 6 amino groups; curing agents derived from polythiols having from about 2 to 6 amino groups, preferably from 2 to 4 amino groups.

Additional chemical curing agents suitable for use herein include ketone blacked polyamides Ketone blocked polyamines (sometimes called ketimines) are produced by condensing amines with ketones to produce alkylnitrilo (1-alkyl) alkylidyne compounds.

For example, 2 moles of ketone reacted with diethylenetriamine $$R_2C{=}O + H_2NCH_2CH_2\overset{H}{N}CH_2CH_2NH_2 \longrightarrow$$

Ketone         Diethylenetriamine $$R_2C{=}N{-}CH_2CH_2\overset{H}{N}CH_2CH_2{-}N{=}CR_2 + H_2O$$

Ketone-blocked Polyamine         Water yield a compound in which both primary amines are blocked. In this case, as there is still a reactive hydrogen present, reaction of the imine with 1 mole of phenyl glycidyl ether eliminates the active hydrogen on the secondary amine:

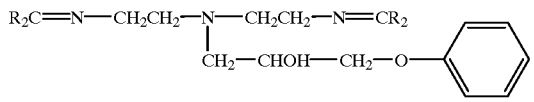

Such a compound, when incorporated into the composition is very nonreactive. However, because of hydrolytic instability of the double bond in these compounds, hydrolysis occurs with moisture from the air once the composition is applied, and the regenerated primary amines provide cure. The ketone which is regenerated diffuses to the surface and evaporates.

The regenerated amine reacts very rapidly with the acrylic resin, even at ambient temperatures. This causes rapid solidification of the adhesive, thereby holding the bonding adhesive in position while the epoxy resin is cured by the amine.

The curing agent may be derived from a polyamine having from 2 to 10 amino groups, preferably from 3 to 6 amino groups. The ketone blocking group may be derived from a ketone of the formula $R_1R_2C=O$ where $R_1$ and $R_2$ are, independently, alkyl groups having from 1 to 10 carbon atoms, preferably from 2 to 6 carbon atoms.

(ii) Heat Curing

Adhesive compositions which are capable of curing by the action of heat preferably contain at least one free radical polymerization initiator. This free radical polymerization initiator can be any of the known free radical-generating initiators conventionally used in vinyl polymerization and is preferably an organic peroxide or azo compound. The initiators can be used in conventional amounts, generally from 0.01 to 15%, preferably 0.05 to 10%, more preferably from about 0.1% to about 5% and especially from a out 0.5% to about 4% by weight of the polymerisable material. Suitable organic peroxides include dialkyl peroxides such as tert.butyl peroxide and 2,2 bis(tert.butylperoxy)propane, diacyl peroxides such as benzoyl peroxide and acetyl peroxide, peresters such as tert.butyl perbenzoate and tert.butyl per-2-ethylhexanoate, perdicarbonates such as dicetyl peroxy dicarbonate and dicyclohexyl peroxy dicarbonate, ketone peroxides such as cyclohexanone peroxide and methylethylketone peroxide, and hydroperoxides such as cumene hydroperoxide and tert.butyl hydroperoxide. Suitable azo compounds include azo bis (isobutyronitrile) and azo bis (2,4-dimethylvaleronitrile). Accelerators of free radical polymerization, for example tertiary amines, ketimines, transition metal salts such as cobalt naphthenate and vanadium monobutyl phosphite and sulphimides, may be used together with the initiators.

The temperature and time needed to heat cure the adhesive compositions will depend on the actual components and may range from 80° to 200° C.

(iii) Light Curing

As herein before detailed the adhesive compositions according to the present invention may be cured by light in the presence of a photoinitiator (III). Suitable photoinitiator or photosensitizers for inclusion herein include; aromatic carbonyl compounds, for example a benzoin, a benzoin alkyl ether such as the isopropyl or n-butyl ether, a-substituted acetophenones, for example a benzil ketal such as benzil dimethyl ketal; a-haloacetophenones such as trichloromethyl p-tert.butylphenyl ketone; a-aminoacetophenones such as dimethylaminomethyl phenyl ketone, morpholinomethyl phenyl ketone and others as described in EP-A-0 003 002, EP-A-0088050, EP 0 117233 and EP-A-0138754; dialkoxyacetophenones such as diethoxyacetophenone, alpha, alpha dichloro aceto p-phenoxy phenone, or a-hydroxyacetophenones such as 1-hydroxycyclohexylphenyl ketone, 1-hydroxy cyclohexyl acetophenone, alpha, alpha dimethyl, alpha-hydroxy acetophenone, p-isopropyl phenyl, 2-hydroxy 2, methyl propan-1-one, or berzophenones such as benzophenone itself, chlorobenzophenone, 4-phenylbenzophenone, 3,3'-dimethyl 4 methoxybenzophenone, 4,4' dimethylamino-benzophenone, p-methoxybenz.ophenone and bis(4-dimethylamino) benzophenone; acrylated benzophenones; 4-benzoyl-4'-methyl diphenyl sulphide; aminobenzoates such as, amyl p-dimethyl aminobenzoate, 2(n-butoxy) ethyl 4-dimethyl amino benzoate, 2-ethyl hexyl, p-dimethyl-amino benzoate; oximes such as 1 phenyl-1,2 propane dione-2(o-ethoxy carbonyl)oxime; oxides, such as acylphosphine oxides; 9,10 phenantrene quinone; metallocenes, for example a titanium metallocene such as bis(p-methylcyclopentadienyl) bis-(s-pentafluorophenyl) titanium (IV); Group IVA organometallic compounds, for example a stannane such as trimethyl benzyl stannane, tributyl benzyl stannane or dibutyl dibenzyl stannane, together with a photoreducible dye, typically methylene blue or rose bengal; quinones, such as anthraquinone or camphorquinone, together with an amine having hydrogen attached to an aliphatic alpha carbon atom, preferably a tertiary amine such as bis(4-dimethylamino)-benzophenone and triethanolamine; thioxanthones, for example an alkyl-or halogen-substituted thioxanthone such as 2-isopropylthioxanthone, 2-chlorothioxanthone, 2,4 dimethyl thioxanone, 2,4 dichlorothioxanone, 2,4-diethyl thioxanone; acyl phosphine oxides; or a mixture of two or more thereof.

Preferably, the photoinitiator (III) is an a-substituted acetophenone, a thioxanthone, a benzophenone or a mixture of two or more thereof. In particularly preferred embodiments, the initiator is an alpha-hydroxy substituted acetophenone, an alpha-amino substituted acetophenone or a mixture thereof with a 2-alkylthioxanthone. The photoinitiator can be used in a conventional amount, generally from about 0.01% to about 20%, preferably from about 0.1% to about 10%, more preferably from about 0.15 to about 5% and especially from about 1% to about 5% by weight of the total photopolymerisable content of the adhesive.

Highly preferred for use herein as photoinitiators are bis acylphosphine oxide (BAPO) materials of formula:

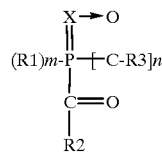

wherein m=1, n=1 and x=Oor m=2, n=0 and x=O or S

R1 denotes a straight chain or branched chain C 1–6 alkyl radical, a cyclohexyl, cyclopentyl, phenyl, napthyl or biphenyl radical, or a straight chain or branched chain C 1–6 alkyl radical, a cyclohexyl, cyclopentyl, phenyl, napthyl or biphenyl radical which is substituted by one or more, F, Cl, Br, I, C 1–4 alkyl and/or C1–4 alkoxy, an S or N containing 5- or 13-membered heterocyclic ring.

R2 and R3, which can be the same or different denote a cyclohexyl, cyclopentyl, phenyl, napthyl or biphenyl radical, a cyclohexyl, cyclopentyl, phenyl, napthyl or biphenyl radical which is substituted by, one or more F, Cl, Br, I, C 1–4 alkyl and/or C1–4 alkoxy, an S or N containing 5- or 6-membered heterocyclic ring, or, R2 and R3 together are joined to form a ring, which contains 4 or 10 carbon atoms and may be substituted with 1 to 13 C 1–4 alkyl radicals.

A particularly preferred mixture of photoinitiators suitable for use in the adhesive compositions according to the present invention is a combination of IRGACURE (RTM) 403 and IRGACURE (RTM) 184 available from Ciba Specialty Chemicals under the trade name IRGACURE (RTM) 1800.

Additional photoinitiators suitable for use herein include di-t-butyl peroxide, dicumyl peroxide, t-butyl hydroperoxide, t-butyl peracetate, peracetic acid, perbenzoic acid, benzoyl peroxide, dichlorobenzoyl peroxide, azobis (isobutyronitrile), dimethyl azobis(isobutyrate), morpholine, diethylamine, piperidine, pyrrolidine, and the like, as well as thioxanones such as 2-chloro thioxanone and isopropyl thioxanone, tri-isopropyl amine, triethylamine, acylphosphine oxides, bis-acyl phosphine oxides, 9,10 phenantrenequinone and 1 phenyl-1,2 propane dione-2(o-ethoxy carbonyl) oxime.

The actinic radiation used to effect cure, of photocurable adhesive compositions herein, may be exclusively ultraviolet radiation, or it may be radiation having wavelengths in both the visible and ultraviolet regions of the spectrum. Radiation having a wavelength of 200 to 800 nm, preferably, 200 to 500 nm is preferred for use herein. The selection, from commercially available equipment, of a suitable radiation source emitting radiation within the wavelength range is a routine matter for those skilled in the art of photocuring. Suitable sources include medium pressure mercury arc lamps and metal halide lamps. Suitable irradiation times may similarly be determined readily by those familiar with photocuring techniques.

Reactive Diluent

The adhesives of the present invention may additionally contain at least one liquid photopolymerisable monovinyl monomer as reactive diluent. Such diluents can be helpful in reducing the viscosity of compositions from which adhesives of the invention are produced, which can facilitate subsequent application to a substrate, and may be subsequently polymerized during photocure of the adhesive. Liquid photopolymerisable acrylic monomers are available commercially or may be prepared by well known procedures. Suitable liquid photopolymerisable monovinyl monomers include vinyl esters such as vinyl acetate; monoacrylic monomers including monoacrylic esters such as alkyl acrylates and alkyl methacrylates, for example n-butyl acrylate, 2-ethylhexyl acrylate, n-octadecyl acrylate and the corresponding methacrylates, hydroxyalkyl acrylates and hydroxyalkyl methacrylates, for example 2-hydroxyethyl acrylate, 2-hydroxypropyl acrylate, 3-hydroxypropyl acrylate, 4-hydroxybutyl acrylate and the corresponding methacrylates, esters of acrylic acid or methacrylic acid with cycloaliphatic monohydric alcohols, especially polycyclic alcohols, for example isobornyl acrylate, dicyclopentenyl acrylate and corresponding methacrylates; esters of acrylic acid or methacrylic acid with polyhydric alcohols, including dihydric alcohols such as ethylene glycol, 1,2-propylene glycol, 1,3-propylene glycol, 1,3-butanediol, 1,4-butanediol, neopentyl glycol, 1,6-hexanediol, diethylene glycol, dipropylene glycol, triethylene glycol, tripropylene glycol and dimethylolcyclohexanes; trihydric alcohols such as glycerol, 1,1,1-trimethylolpropane and trihydroxyethyl isocyanurate; and polyhydric alcohols having four or more hydroxyl groups such as erythritol or pentaerythritol, N-vinyl monomers, such as N,N-dimethylacrylamide which usually are, but are not limited to, N-vinyl heterocycles such as N-vinylpyrrolidone or N-vinylcaprolactam; and mixture of two or more thereof. Preferred monovinyl monomers are monoacrylic esters such as those mentioned above, N-vinyl monomers such as those mentioned above and mixtures thereof. Especially preferred monovinyl monomers are isobornyl acrylate, N-vinylpyrrolidone and N,N-dirnethylacrylamide. Mixtures of two or more of the above mentioned acrylic component can be used.

The reactive diluent may be present in the compositions according to the present invention at levels of from about 5% up to about 70%, preferably from about 20% to about 65%, more preferably from about 30% to about 60%, most preferably from about 50% to about 60% by weight of the light emitting composition.

Optional Materials

As herein before detailed the adhesive compositions of the present invention may include additional optional materials as necessary. Such optional materials as are selected for use in the compositions herein may each be present at levels of from about 0.001% to about 10%, preferably from about 0.01% to about 5%, more preferably from about 0.1% to about 1% by weight such that the combined level of additional optional materials up to about 10% by weight of the present compositions.

An elastomeric polymer may be included in a film adhesive of the invention as a toughening agent. Toughening elastomeric polymers are well known in the adhesives art; they include polymers of conjugated dienes such as butadiene or isoprene, which may be homopolymers or copolymers with other ethylenically unsaturated materials, usually styrene, substituted styrenes and acrylic monomers such as acrylonitrile, alkyl acrylates and allyl methacrylates. These diene polymers may have terminal functional groups such as carboxyl or vinyl groups. Preferred elastomeric polymers are vinyl terminated butadiene-acrylonitrile copolymers, particularly those having number average molecular weights of 500 upwards.

The toughness of a film adhesive of the invention may be increased, if desired, by including in the liquid composition from which the film adhesive is produced, as toughening agent, a polymer having repeating aromatic ether groups in the backbone thereof. Such polymers are available commercially or may be prepared by known procedures; they include advanced, i.e. chain-extended, diglycidyl ethers of bisphenols such as bisphenol A, preferably having an epoxide equivalent weight of at least 200, phenoxy resins, polyphenylene oxides, aromatic polyetherimide resins and aromatic polyetheretherketone resins (PEEK resins;). Preferred toughening agents are bisphenol A-advanced diglycidyl ethers of bisphenol A having an epoxide equivalent weight of at least 220, especially 230 to 300, and phenoxy resins derived from bisphenol A and epichlorohydrin having a molecular weight of 80,000 to 120,000.

Minor amounts of conventional additives can be included in the aforementioned liquid composition, if desired, provided they do not prevent photopolymerisation of the composition on exposure to actinic radiation. For instance, the composition may contain an inhibitor of thermal polymerisation such as hydroquinone or 2,6-di-tert-butyl4-methylphenol, a dye to assist in assessing film quality, adhesion promoters such as silanes and fillers, such as ground glass, which are transparent to actinic radiation.

Substrate Material

In the first instance, the adhesive compositions according to the present invention may be applied to any suitable substrate material. In the preferred application of the compositions according to the present invention the adhesive composition is applied to a substrate (A) and then another substrate (B), such that, the adhesive composition forms a bonding layer between A and B. For the avoidance of doubt, A and B may be the same material or different materials. Suitable substrate materials for use with the compositions of the present invention include those standard and well known in the art.

As discussed earlier herein, the substrate material may have an impact on the degree of fluorescence observed, or may even preclude the combination of particular substrate materials with certain fluorescent agents. In applications of the adhesive compositions according to the present invention, it is preferable, that the substrate does not contain a fluorescent agent itself. It is also preferable that the substrate does not absorb fully in either the UV or visible regions of the spectra. Thus it is highly preferable in the adhesive compositions according to the present invention that the fluorescent agent is selected to optimize the regions of transmission in both the ultra violet and visible regions of the substrate.

Preferred substrate materials for use herein include metallised materials and optically clear materials and mixtures thereof.

Typically metallised layers are employed as reflective data carrying layers. The thickness of such layers in general from about 20 to about 50, preferably from about 30 to about 40 nm. Metallised materials suitable for use herein include: aluminum (Al), silver (Ag), gold (Au) and mixtures thereof; silicone and silicone based materials such as silicone carbides, silicone nitrides and derivatives thereof.

An optically clear substrate material, as defined herein, means any substrate material which is capable of passing at least 5% light at a 10 mm region between about 200 to about 700 nm. Examples of suitable optically clear substrate materials for use herein include:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one, or more than one, metal of groups IVb, Vb, VIB or VIII of the Periodic Table. These metals usually have one or more than one ligand, typically oxides, halides, alcoholates, esters, ethers, amines, alkyls, alkenyls and/or aryls that may be either π or σ coordinated. These metal complexes may be in the free form or fixed on substrates, typically on activated magnesium chloride, titanium (III) chloride, alumina or silicon oxide. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (Du Pont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example L-DPEIHDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/-isoprene copolymers, ethylenelalkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylene-norbornene; and mixtures of such copolymers with one other and with polymers mentioned in 1) above, for example polypropylene/ethylene-propylene copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivaties, for example styrene/butadiene, styrene/acrylonitrile, styrenelalkyl methacrylate, styrene/butadiene/alkyl acrylate, styrenelbutadienelalkyl methacrylate, styrene/maleic anhydride, styrene/acrylonitrile/methyl acrylate; mixtures of high impact strength of styrene copolymers and another polymer, for example a polyacrylate, a diene polymer or an ethylene/-propylene/diene terpolymer; and block copolymers of styrene such as styrene/butadiene/-styrene, styrene/isoprene/styrene, styrene/ethylene/butylene/styrene or styrene/ethylene/-propylene/styrene.

7. Graft copolymers of styrene or cc-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene teerpolymers; styrene and acrylonitrile on polyalkyl acrylates or polyalkyl methacrylates, styrene and acrylonitrile on acrylate/butadiene copolymers, as well as mixtures thereof with the polymers listed under 6), for example the copolymers mixtures known as ABS, MBS, ASA or AES polymers.

8. Halogen-containing polymers such as poly chloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidine chloride/vinyl acetate copolymers.
9. Polymers derived from $\alpha,\beta$-unsaturated acids and derivatives thereof such as polyacrylates and polymethyacrylates; polymethyl methacrylates, polyacrylamides and polyacrylonitriles, impact-modified with butyl acrylate.
10. Copolymers of the monomers mentioned under 9) with each other or with other unsaturated monomers, for example acrylonitrile/butadiene copolymers, acrylonitrile/-alkyl acrylate copolymers, acrylonitrile/alkoxyalkyl acrylate or acrylonitrile/vinyl halide copolymers or acrylonitrile/alkyl methacrylate/butadiene terpolymers.
11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.
12. Homopolymers and copolymers of cyclic ethers such as polyalkylene gycols, polyethylene oxide, polypropylene oxide or copolymers thereof with bisglycidyl ethers.
13. Polyacetals such as polyoxymethylene and those polymethylenes which contain ethylene oxide as a comonomer; polyacetals modified with thermoplastic polyurethanes, acrylates or MBS.
14. Polyphenylene oxides and sulfides, and mixtures of polyphenylene oxides with styrene polymers or polyamides.
15. Polyurethanes derived from hydroxyl-terminated polyethers, polyesters or polybutadienes on the one hand and aliphatic or aromatic polyisocyariates on the other, as well as precursors thereof.
16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from an m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
17. Polyureas, polyimides, polyamide-imides, polyetherimides, polyesterimicles, polyhydantoins and polybenzimidazoles.
18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.
19. Polycarbonates and polyester carbonates.
20. Polysulfones, polyether sulfones and polyether ketones.
21. Crosslinked polymers derived from aldehydes on the one hand and phenols, ureas and melamines on the other hand, such as phenol/formaldehydes resins, urea/formaldehyde resins and melaminelformaldehyde resins.
22. Drying and non-drying alkyd resins.
23. Unsaturated polyester resins derived from copolyesters of saturated and unsaturated dicarboxylic acids with polyhydric alcohols and vinyl compounds as crosslinking agents, and also halogen-containing modifications thereof of low flammability.
24. Crosslinkable acrylic resins derived from substituted acrylates, for example epoxy acrylates, urethane acrylates or polyester acrylates.
25. Alkyd resins, polyester resins and acrylate resins crosslinked with meblamine resins, urea resins, isocyanates, isocyanurates, polyisocyanates or epoxy resins.
26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.
27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
28. Blends of the aforementioned polymers (polyblends), for example PP/EPDM, polyamide/EPDM or ABS, PVC/EVA, PVC/ABS, PVC/MBS, PC/ABS, PIBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PAIPP, PAJPPO, PBT/PC/ABS or PBT/PEP/PC.
29. Glass, prepared from silicone dioxide optionally modified by inclusion of Na, Ca, B or Pb to obtain properties for paricular uses and applications.

Also any of the above materials coated with a thin reflective layer such that conditions of optical clarity are retained.

Application of Adhesive Compositions to Substrates

The adhesive compositions according to the present invention are preferably applied to substrate material in a thickness of from about 0.01 to about 200 micrometers. Methods of application of the adhesive, as a layer, to the selected substrate material include: capillary action where the adhesive is applied between two substrates and its flow between them is controlled by its viscosity; spin coating where the adhesive is applied to a flat material and spun at high speed to achieve an even coating, before, or at the same time as, application of the second substrate; screen printing where the adhesive is applied through a thin mesh to achieve an even coating prior to application of a second substrate; roller coating where the adhesive is applied from a roller to acheive a thin even coating prior to application of a second substrate; K-bar coating where the adhesive is applied and spread by application of a wire wound rod to achieve an even coating prior to application of a second substrate; and spray coating where the adhesive is applied in the form of an air born aerosol to achieve an even coating prior to application of a second substrate.

As herein before disclosed, the light emitting adhesive compositions according to the present invention are especially preferred for use in applications wherein accurate bondline measurements are important. One such application is the manufacture of dual layer Digital Versatile Discs (hereinafter referred to as DVDs).

The term DVD disc, as defined herein, means, a disc comprising a plurality of layer, at least one of which is a data carrying layer at least one of which is a bonding layer and at least one of which is a protective or covering layer. For the avoidance of doubt, the protective or covering layer as defined herein may also contain data information.

It has been found that by use of the light emitting adhesive compositions as the bonding material in DVD manufacture, fast, efficient 'in-line' scanning of DVD discs for imperfections within the boding layer is now possible, via the use of suitable optical measuring equipment.

In the preparation of DVDs, plastic discs, at least one of which may be coated with a metallic layer, are bonded together with an adhesive. It is highly important in the manufacture of DVDs that the adhesive which bonds the discs together, fully covers, the data-carrying area of the disc. The size and shape of the disc as well as the area to be covered by adhesive can be variable. Typically DVDs are manufactured in an environment wherein 'in-line' process control is desirable to avoid continued manufacture of defective discs. However, in practice, visual inspection of discs by the naked eye to detect defects within adhesive bonding layer of the disc, such as trapped air bubbles is inefficient. It is not possible to carry out 'in-line' bond line thickness control measurements with the naked eye. As previously detailed herein, in DVD manufacture, accurate 'in-line' bondline control is highly important. The target bondline thickness for DVD applications are in the range of from about 20 to 60, preferably from about 50 to 60, more preferably from about 51 to about 59 and especially about 55 μm.

As such, the light emitting adhesive compositions according to the present invention can provide increased efficiency and improved manufacturing time in multi-layer disc manufacturing processes. Indeed it is a further embodiment of the-present invention that scanning of a plurality of light emitting adhesive layers could be achieved via the selection and utility of the different adhesive according of the present invention which contain different light emitting layers. Similarly where a complex multi-layer disc is manufactured, provided, there is contained therein a light impermissible or substantially light impermissible layer, then the bondline control advantages as described herein can be applied to measure adhesives on either side of said substantially light impermissible layer. Substantially light impermissible layer as defined herein means a layer through which light is not transmitted to a degree which interferes with data reading.

In a preferred embodiment of the present invention, the light emitting adhesive is used to bond together two data-carrying discs, which may be made of polycarbonate or the like, wherein one or both polycarbonate layer may be coated, on the side to be bonded by the adhesive, with a metallised layer.

In highly preferred embodiments each polycarbonate layer is metal coated. Especially preferred are discs wherein the metal coatings on the polycarbonate layers are different. This is to enable selective data retrieval from either layer via use of suitable equipment.

As hereinbefore detailed, the presence of a light emitting adhesive composition according to the present invention may be detected via illumination with a suitable radiation source, such as a UV lamp. similarly a radiometer (or other such meter) can be employed to measure the visible light emitted from any such system. The presence, or absence of air bubbles can be detected from either simple visual scanning of these illuminated profiles or via view enhancement using a computerized scanning system or the like.

One method of determining the bondline thickness of the adhesive is to measure the light emitted at any, or several fixed points of the disc, preferably including the inner diameter of the bonded disc and the outer diameter of the disc and any number of points in-between as desired.

A further method is to create a representation of the illuminated disc picture and compare this versus a standard representation to calculate a percentile correlation. Such levels of correlation, greater than about 90%, 90% to about 95%, greater than about 91%, 95% to about 99% and the like, between the disc as manufactured and scanned and the standard representation can be selected according to particular process requirements. An additional benefit of such a monitoring system is an improved response-recognition time within the process line as it is running.

To read the data contained on the two data carrying layers a laser is typically employed. As the laser is required to read the data from at least one of the metallised layers by reading through the light emitting adhesive layer, it is preferable that the refractive index (RI) of the adhesive is compatible with that of the selected substrate material (such as a polycarbonate layer), in order to minimize any potential distortion of the data reading.

The preferred adhesive materials for use in DVD disc manufacture are photocurable adhesives such as acrylic and cationic epoxy adhesives. These are particularly preferred for fast, effective curability. It is further preferred that the adhesive used in disc manufacture has low shrinkage (either on curing, or during the total manufacturing process). In general less than about 15%, preferably less than about 10%, and more preferably less than about 8% shrinkage is preferred. Additionally, due to the conditions under which such discs and the like are manufactured it is preferable that the selected bonding adhesive has good environmental resistance properties. The preferred light emitting adhesive compositions according to the present invention have good stability under standard stressed storage conditions (96 hours and 80° C. and at 95% relative humidity).

The following, non-limiting examples are representative of the adhesive compositions according to the present invention. All percentages are on a by weight basis.

EXAMPLE 1

This example illustrates the non-invasive measurement of the thickness of a light emitting adhesive composition according to the present invention (Adhesive A), as well as illustrating the measurement of the light transmitted through Adhesive A when it is used to bond together two glass sheets.

| Adhesive A | |
|---|---|
| Photomer (RTM) 6162 | 30.0 g |
| Tripropyleneglycol diacrylate | 12.0 g |
| Phenoxyethyl acrylate | 6.5 g |

| Adhesive A | |
|---|---|
| Irgacure (RTM) 651 | 1.5 g |
| Uvitex (RTM) OB | 0.036 g |

Adhesive A was prepared by mixing the above materials together at room temperature and then placed in an oven at about 60° C. until clear solutions were obtained.

Adhesive A was cured between glass sheets, coated with release spray, and suitable spacers which after passing three times under a Fusion lamp (D bulb, 120 W/cm) gave thin films. The thickness of the films were measured with a calibrated Elcometer Thickness Gauge on aluminium.

These samples were placed between the two substrates as shown below and then placed on a UVP Model UVL-21 "Blak-Ray" UV lamp and the light passing through the film measured on a UVP Multi-Sense 100 radiometer at 436 nm in mW/cm$^2$.

| Sample | Thickness (micrometers) | Visible light(mW/cm$^2$) |
|---|---|---|
| I 3 mm Glass substrates | | |
| a | 0 | 0.02 |
| b | 20 | 0.07 |
| c | 36 | 0.10 |
| d | 61 | 0.10 |
| II 0.6 mm Polycarbonate | | |
| e | 0 | 0.04 |
| f | 20 | 0.11 |
| g | 36 | 0.15 |
| h | 61 | 0.15 |

EXAMPLE 2

This example illustrate the non-invasive measurement of the light emitted from an adhesive composition according to the present invention (Adhesive B), when placed between a substantially non-light transmitting layer (Al of thickness 1.2 mm), and an optically clear layer (polycarbonate).

| Adhesive B | |
|---|---|
| Photomer (RTM) 6162 | 30.0 g |
| Tripropyleneglycol diacrylate | 12.0 g |
| Phenoxyethyl acrylate | 6.5 g |
| Irgacure (RTM) 651 | 1.5 g |
| Uvitex (RTM) OB | 0.0065 g |

Adhesive B was prepared by the method outline for Adhesive A as herein before detailed and was then cured between glass sheets, coated with release spray, and suitable spacers which after passing three times under a Fusion lamp (D bulb, 120 W/cm) gave thin films. The thickness of the films were measured with a calibrated Elcometer Thickness Gauge on aluminium.

These samples were placed between an aluminium and a 0.6 mm polycarbonate substrate then placed under a Staub 5000 W static ultraviolet lamp. The light from the Staub lamp was filtered with a BLAK-RAY filter and a radiometer placed so as to measure the visible light at 436 nm transmitted from the adhesive film.

| Sample | Thickness (micrometers) | Visible light(mW/cm$^2$) |
|---|---|---|
| i | 0 | 0.02 |
| j | 41 | 0.05 |
| k | 52 | 0.06 |
| l | 104 | 0.05 | where
1) Photomer (RTM) 6162 = A aromatic difunctional urethane acrylate supplied by Harcros.
2) Irgacure (RTM) 651 = A photoinitiator supplied by Ciba Specialty Chemicals.
3) Uvitex (RTM) OB = A flurescent material supplied by Ciba Specialty Chemicals.

What is claimed is:

1. An adhesive composition made up of one or more adhesive components, which composition comprises
   (I) a photocurable material having, on average, more than one acrylic group per molecule, from at least about 20% to about 70% by weight of said material being a urethane acrylate, a polyester acrylate or a mixture of a urethane acrylate and a polyester acrylate;
   (II) as sole or major solid film-forming optional component, a solid polyvinyacetal;
   (III) a photoinitiator for photopolymerisation of acrylic compounds; and
   (IV) a light emitting material.

2. The composition of claim 1 wherein the adhesive component is selected from: acrylic adhesives; cyanoacrylic adhesives, epoxy adhesives, polyurethane adhesives, silicone adhesives, cationic adhesives, hot melt adhesives, anerobic adhesives and mixtures thereof.

3. The composition of claim 1 wherein the adhesive component comprises at least 90% by weight of the adhesive composition.

4. The composition of claim 1 wherein the light emitting material is selected from fluorescent, luminant and phosphorescent materials and mixtures thereof.

5. The composition of claim 1 wherein the light emitting material is present at levels of from about 0.001% to about 1% by weight of the adhesive composition.

6. The composition of claim 1 wherein the photocurable material polyester (I) is present in an amount of from at least about 20% to about 70% by weight of the adhesive composition.

7. The composition of claim 1 wherein the photopolymerisation initiator (III) is present at levels of from about 0.01% to about 20% by weight of the total photopolymerisable acrylic component of the composition.

8. A data-carrying laminate comprising at least one data-carrying substrate bonded to a further substrate selected from data-carrying substrates and transparent protective materials by an adhesive composition according claim 1, wherein the adhesive composition is photocured between, and in contact with the data-carrying substrate(s) and/or the protective substrate.

9. The laminate according to claim 8 wherein the data-carrying substrate is selected from; polymers of monoolefins and diolefins; polyolefins; copolymers of monoolefins and diolefins; hydrocarbon resins; polystyrene; copolymers of styrene with dienes or acrylic derivatives; graft colpolymers of styrene; halogen-containing polymers; polymers derived from αβ-unsaturated acids; polymers derived from unsaturated alcohols and amines; homopolymers and copolymers of cyclic ethers; polyacetals; polyethylene oxides and sulfides; polyurethanes; polyamides and copolyamides derived from diamins and dicarboxylic acids; polyureas, polyimidees, polyamide-imides, polyehterimides, polyesterimides, polyhydantoins and polybenzimidazoles; polyesters derived from dicarboxylic acids and diols; polycarbonates and polyester carbonates; polysulfones, polyether sulfones and polyehter ketones; crosslinked polymers derived from aldehydes; drying and non-drying alkyd resins; unsaturated poly(ester resins; crosslinkable acrylic resins derived from substituted acrylates; alkyd resins crosslinked with melamine resins; crosslinked epoxy resins derived from aliphatic, cycloaliphatic; heterocyclic or aromatic glycidyl compounds; natural polymers such as cellulose, rubber, gelatin and chemically modified homologous derivative thereof; polymer blends; glass and mixtures thereof.

10. The laminate according to claim 8 wherein the data-carrying substrate comprises a polycarbonate material coated with a metal selected from gold, silver and aluminium or a non-metallic coating material selected from silicon, silicon carbide, silicon nitride and mixtures thereof.

11. A method for the detection of the thickness of the adhesive composition at specified points when bonded in a laminate according to claim 8 comprising (I) measurement of the light emitted by the bonding adhesive composition at several points across the bonded surface.

12. The composition of claim 3 wherein the adhesive component comprises from about 90% to about 99.999% by weight of the adhesive composition.

13. The composition of claim 12 wherein the adhesive component comprises from about 99.90% to about 99.98% by weight of the adhesive composition.

14. The composition of claim 1 wherein the light emitting material is a fluorescent material selected from distyryl benzenes, distyryl biphenols and divinyl stilbenes, triazinyl amino stilbenes, stilbenzyl-2H-triazoles, benzoxazoles, furans and benzo (b) furans, benzimidazoles, 1,3-diphenyl-2-pyrazolines, coumarins, naphthalimides, 1,3,5-triazin-2-yl derivatives and mixtures thereof.

15. The composition of claim 5 wherein the light emitting material is present at levels of from about 0.01% to about 0.8% by weight of the adhesive composition.

16. The composition of claim 15 wherein the light emitting material is present at levels of from about 0.08% to about 0.2% by weight of the adhesive composition.

17. The composition of claim 1 wherein from about 30% to about 60% by weight of said photocurable material is a urethane acrylate, a polyester acrylate or a mixture of a urethane acrylate and a polyester acrylate.

18. The composition of claim 17 wherein from about 45% to about 50% by weight of said photocurable material is a urethane acrylate, a polyester acrylate or a mixture of a urethane acrylate and a polyester acrylate.

19. The composition of claim 6 wherein the photocurable material (I) is present in an amount of from about 30% to about 60% by weight of the adhesive composition.

20. The composition of claim 19 wherein the photocurable material (I) is present in an amount of from about 45% to about 50% by weight of the adhesive composition.

21. The composition of claim 7 wherein the photopolymerisation initiator (III) is present at levels of from about 0.1 to about 10% by weight of the total photopolymerisable acrylic component of the composition.

22. The composition of claim 21 wherein the photopolymerisation initiator (III) is present at levels of from about 1% to about 5% by weight of the total photopolymerisable acrylic component of the composition.

* * * * *